United States Patent
Amiot et al.

(10) Patent No.: US 7,993,097 B2
(45) Date of Patent: Aug. 9, 2011

(54) COOLING DEVICE FOR A STATIONARY RING OF A GAS TURBINE

(75) Inventors: Denis Amiot, Dammarie les Lys (FR); Pascal Lefebvre, Vulaines sur Seine (FR)

(73) Assignee: SNECMA, Paris (FR)

( * ) Notice: Subject to any disclaimer, the term of this patent is extended or adjusted under 35 U.S.C. 154(b) by 1719 days.

(21) Appl. No.: 11/119,818

(22) Filed: May 3, 2005

(65) Prior Publication Data
US 2005/0249584 A1   Nov. 10, 2005

(30) Foreign Application Priority Data

May 4, 2004   (FR) ...................................... 04 04739

(51) Int. Cl.
*F01D 11/08*   (2006.01)
(52) U.S. Cl. .................................... 415/116; 415/173.1
(58) Field of Classification Search ............... 415/168.1, 415/173.1
See application file for complete search history.

(56) References Cited

U.S. PATENT DOCUMENTS

| | | | |
|---|---|---|---|
| 4,177,004 A * | 12/1979 | Riedmiller et al. ........... | 415/116 |
| 4,573,866 A | 3/1986 | Sandy, Jr. et al. | |
| 5,197,853 A | 3/1993 | Creevy et al. | |
| 5,205,708 A * | 4/1993 | Plemmons et al. ........ | 415/173.1 |
| 5,641,267 A * | 6/1997 | Proctor et al. ............. | 415/173.1 |

FOREIGN PATENT DOCUMENTS

| | | |
|---|---|---|
| EP | 0 709 550 A1 | 5/1996 |
| EP | 1 213 444 A2 | 6/2002 |
| FR | 2 238 838 | 2/1975 |
| FR | 2 407 342 | 5/1979 |
| FR | 2 574 115 | 6/1986 |

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A cooling device for a stationary ring surrounding a gas-turbine hot-gas flow path, said ring being made up of a plurality of ring segments that are fastened by upstream and downstream fastener systems onto a plurality of spacer segments forming a support spacer surrounding said ring so as to co-operate therewith to define at least one annular impact cavity into which at least one air supply orifice opens out, each ring segment having walls that are pierced with a plurality of air exhaust holes opening out both into the impact cavity, and into the hot-gas flow path, the device further comprising means for channeling the air coming from leakage through the seals of the fastener systems, and for directing it towards at least one of the axial ends of the ring segments so as to cool said end(s).

19 Claims, 2 Drawing Sheets

COOLING DEVICE FOR A STATIONARY RING OF A GAS TURBINE

BACKGROUND OF THE INVENTION

The present invention relates to the general field of cooling devices for stationary rings surrounding flow paths for hot gas in gas turbines. It relates more particularly to a cooling device that makes it possible to channel and to use the air coming from leakage through the seals of the fasteners that fasten together the ring-forming segments and their supports.

In a gas turbine, e.g. in a high-pressure turbine of a turbomachine, the moving blades are surrounded by a stationary ring over the entire circumference of a stationary housing forming a shroud. The ring is generally in the form of sectors, i.e. it is made up of a plurality of ring segments that are placed end to end, and it contributes to defining the flow path for the hot gas coming from the combustion chamber of the turbomachine and passing through the turbine.

The ring segments are fastened onto the shroud by means of a stationary support-forming spacer that is likewise in the form of sectors made up of a plurality of spacer segments. More particularly, the ring segments are fastened onto the spacer segments by means of upstream and downstream fastener systems. In addition, the ring segments and the spacer segments are disposed relative to one another so as to form an annular "impact" cavity which is radially defined between axial annular walls of the spacer and ring segments.

It is known to provide such ring segments with cooling devices enabling them to withstand the high temperatures of the hot gas with which they are in contact. One of the methods of cooling the ring segments consists in forming a cooling-air supply orifice in each spacer segment so as to supply air to the impact cavity formed between the ring and spacer segments, and in forming a plurality of air exhaust holes in walls of the ring segments, said air exhaust holes opening out both into the cavity, and into the hot-gas flow path 6. An impact plate can also be disposed in the impact cavity between the air supply orifice and the air exhaust holes of the ring segments. Because of the pressure difference on each side of the impact plate, the air passes through said plate, impacts against the walls of the ring segments to be cooled, and is evacuated via the air exhaust holes pierced through said walls.

Such an arrangement generally enables the ring segments to be cooled effectively. However, in view of the significant difference in air pressure between the impact cavity and the hot-gas flow path, air leaks occur through the fastener systems that fasten the ring segments onto the spacer segments. These leaks result from the fastener systems being poorly sealed. In practice, the leaked air flows tangentially along a ring segment and is evacuated into the hot-gas flow path at the join between adjacent ring segments. This air, which can represent up to 0.2% of the total flow of cooling-air, does not participate in cooling the ring segments. This represents a significant quantity of air that is not used, and that could be used to cool other sectors of the turbomachine.

OBJECT AND SUMMARY OF THE INVENTION

The main object of the present invention is to mitigate such drawbacks by proposing a cooling device that enables the leakage air to participate in cooling the ring segments.

To this end, a cooling device is provided for a stationary ring surrounding a gas-turbine hot-gas flow path, said ring being made up of a plurality of ring segments that are fastened by upstream and downstream fastener systems onto a plurality of spacer segments forming a stationary annular support spacer surrounding said ring so as to co-operate therewith to define at least one annular impact cavity into which at least one cooling-air supply orifice opens out, each ring segment having walls that are pierced with a plurality of air exhaust holes opening out both into the impact cavity, and into the hot-gas flow path, the device further comprising means for channeling the air coming from leakage through the seals of the fastener systems that fasten together the ring and spacer segments, and for directing it towards at least one of the axial ends of the ring segments in contact with the hot gas so as to cool said end(s).

As a result, the air coming from leaks through the fastener systems is not wasted needlessly and does indeed cool the ring segments. In practice, it makes it possible to lower the temperature of certain zones of the ring segments by up to about 20° C.

More particularly, at each upstream fastener system, the cooling device advantageously includes an upstream circuit for channeling the air coming from leakage through the seals, and for directing it towards the upstream tips of the ring segments so as to cool them.

Such an upstream circuit may comprise at least one axial air flow path opening out both into an upstream circumferential space that is radially defined between the inner upstream hooks and axial walls of the spacer segments, and into the upstream notches of the ring segments that are fastened onto the spacer segments.

The upstream circuit preferably comprises a plurality of axial air flow paths that are evenly spaced apart around its circumference. The air flow paths may be formed in the outer upstream hooks of the ring segments and/or in the inner upstream hooks of the spacer segments.

Still more particularly, at each downstream fastener system, the device advantageously includes a downstream circuit for channeling the air coming from leakage through the seals, and for directing it towards the downstream tips of the ring segments so as to cool them.

Such a downstream circuit may comprise at least one axial air flow path opening out both into a downstream circumferential space that is radially defined between the outer downstream hooks of the ring and spacer segments, and into the downstream notches of the ring segments.

The downstream circuit preferably comprises a plurality of axial air flow paths that are evenly spaced apart around its circumference. The air flow paths may be formed in the outer downstream hooks of the ring segments and/or in the inner branches of the clips.

The present invention also provides a stationary ring surrounding a gas-turbine hot-gas flow path, and including a cooling device as defined above.

BRIEF DESCRIPTION OF THE DRAWINGS

Other characteristics and advantages of the present invention appear from the following description, given with reference to the accompanying drawings which show a non-limiting embodiment. In the figures.

DETAILED DESCRIPTION OF AN EMBODIMENT

Figure 1:
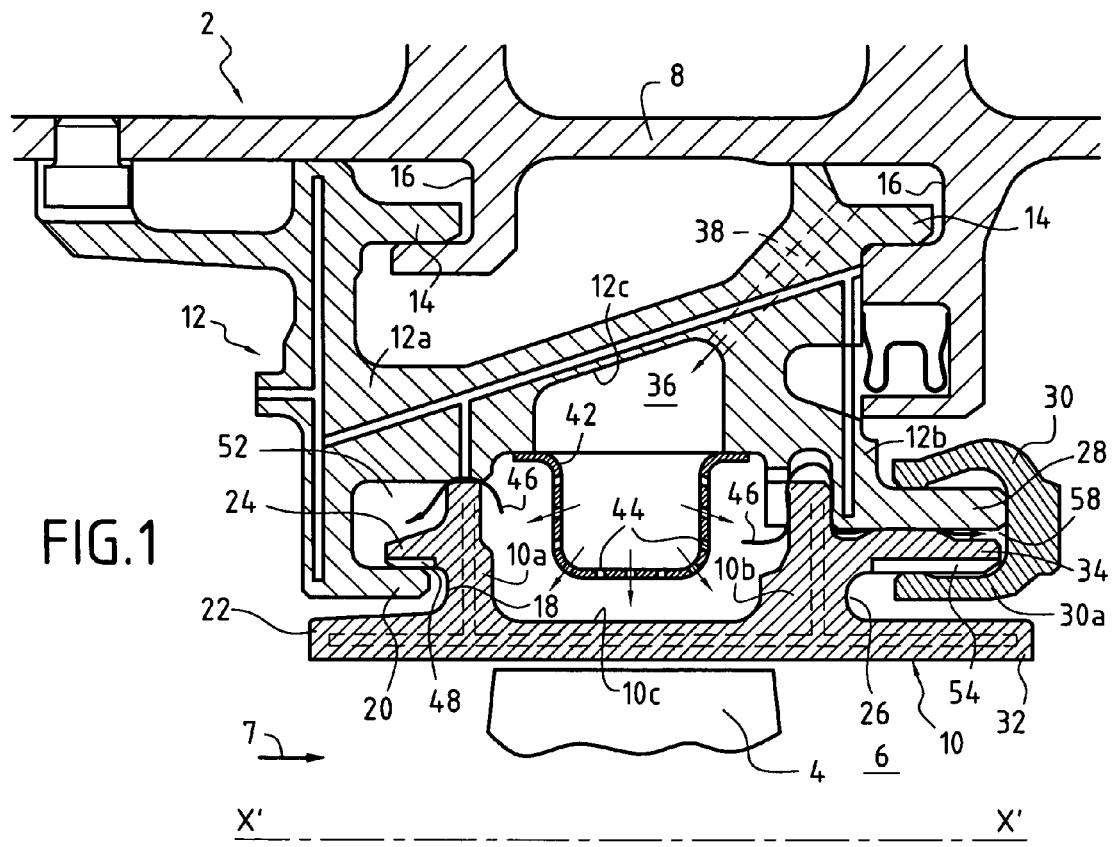
FIG. 1 is a longitudinal section view of a cooling device constituting an embodiment of the invention.

With reference to FIG. 1, a turbomachine high-pressure turbine 2 includes a plurality of moving blades 4 disposed in a flow path 6 for the hot gas coming from the combustion chamber (not shown) and flowing in the direction shown by arrow 7. The blades 4 are surrounded by a stationary ring over the entire circumference of a stationary annular housing of axis XX' forming a shroud 8 of the turbomachine.

The stationary ring is in the form of sectors, i.e. it is made up of a plurality of ring segments 10 that are placed end to end so as to form a continuous circular surface surrounding part of the hot-gas flow path 6.

The ring segments 10 are fastened onto the shroud 8 by means of a support-forming stationary spacer that is likewise in the form of sectors made up of a plurality of spacer segments 12. Each spacer segment 12 is mounted on the shroud 8 by means of hooks 14 that are axially engaged in notches 16 formed in the shroud 8. Each ring segment 10 is mounted on a spacer segment 12 by means of upstream and downstream fastener systems.

More particularly, each upstream fastener system comprises: an upstream notch 18 formed in the upstream radial wall 10a of a ring segment 10; and an inner upstream hook 20 formed in an upstream radial wall 12a of the spacer segment 12 onto which the ring segment is fastened.

The upstream notch 18 of the ring segment 10 is radially defined between an upstream tip 22 and an outer upstream hook 24, both of which project axially relative to the upstream radial wall 10a of the ring segment, the upstream tip 22 being in direct contact with the hot gas flowing along the flow path 6. The inner upstream hook 20 of the spacer segment 12 is axially engaged in the upstream notch 18 defined in this way.

Each downstream fastener system comprises: a downstream notch 26 formed in the downstream radial wall 10b of a ring segment 10; an outer downstream hook 28 of a downstream wall 12b of a spacer segment 12 onto which the ring segment is fastened; and a clip 30.

The downstream notch 26 of the ring segment 10 is radially defined between a downstream tip 32 and an outer downstream hook 34, both of which project axially relative to the downstream radial wall 10b of the ring segment, the downstream tip 32 being in direct contact with the hot gas flowing along the flow path 6. The outer downstream hook 28 of the spacer segment 12 bears radially against the outer downstream hook 34 of the ring segment 10.

The clip 30, of the C-clip type, surrounds the respective outer downstream hooks 34, 28 of the ring and spacer segments 10, 12, thereby causing the hooks to bear radially against each other.

The ring and spacer segments 10, 12 are also disposed relative to one another so as to define at least one annular "impact" cavity 36 for cooling the ring segments 10. The impact cavity 36 is radially defined between an axial annular wall 12c of the spacer segments 12 and an axial annular wall 10c of the ring segments 10.

Each spacer segment 12 also includes at least one cooling-air supply orifice 38 which opens out into the impact cavity 36 so as to supply said cavity with cooling air. The cooling air can come from the air flowing round the combustion chamber of the turbomachine.

Figure 2:
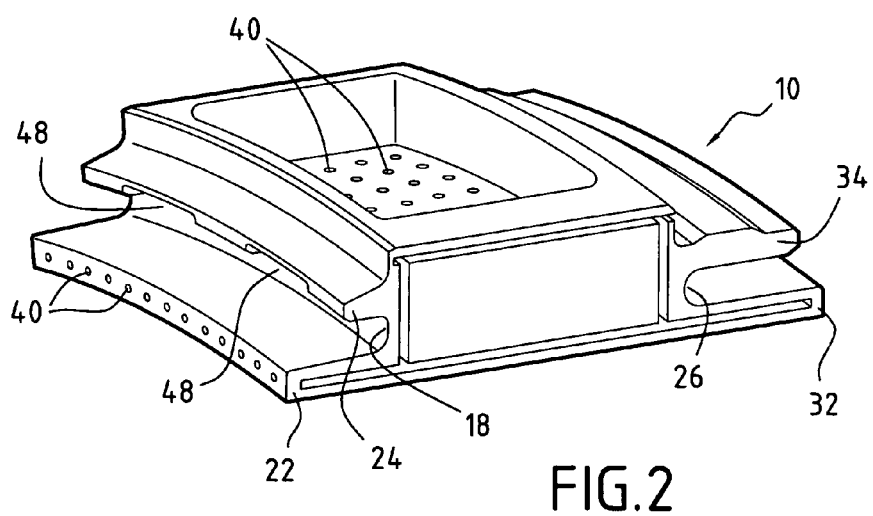
FIG. 2 is a perspective view of a ring segment fitted with the FIG. 1 cooling device.

The ring segments 10 are themselves provided with walls that are pierced with a plurality of air exhaust holes 40 opening out both into the impact cavity 36, and into the hot-gas flow path 6 (FIG. 2). More precisely, the air exhaust holes 40 open out into the flow path 6 at the upstream tip 22 of the ring segment 10 (which is the hottest zone) and slope axially and radially so as to increase the area for heat exchange by thermal pumping.

A channel-section impact plate 42, having a plurality of holes 44 formed in its bottom, is also disposed in the impact cavity 36 between the air supply orifice 38 and the air exhaust holes 40. Because of the pressure difference on each side of the impact plate 42, the air passes through said plate via the holes 44, impacts against the walls of the ring segments 10 to be cooled, and is evacuated at their upstream tips 22 via the air exhaust holes 40.

Air leaks occur through the upstream and downstream fastener systems. More precisely, because of the pressure difference between the impact cavity 36 and the hot-gas flow path 6, the cooling air supplying the cavity 36 tends to leak through the upstream and downstream fasteners, following the path shown by arrows 46 in FIG. 1. The air is generally evacuated into the hot-gas flow path 6 at the join between two adjacent ring segments 10. In addition, there is more leakage through the upstream fastener systems than through the downstream systems.

In the invention, rather than trying to reduce the leakage through the seals of the upstream and downstream fastener systems, means are provided for channeling the air coming from said leaks, and for directing it towards at least one of the axial ends of the ring segments 10 in contact with the hot gas so as to cool said end(s).

More particularly, in order to channel the air leaks through the upstream fastener systems, an upstream circuit is provided comprising at least one axial air flow path 48, 50 opening out both into an upstream circumferential space 52 that is radially defined between the inner upstream hooks 20 and the axial walls 12c of the spacer segments 12, and into the upstream notches 18 of the ring segments 10 that are fastened onto said spacer segments.

Figure 3:
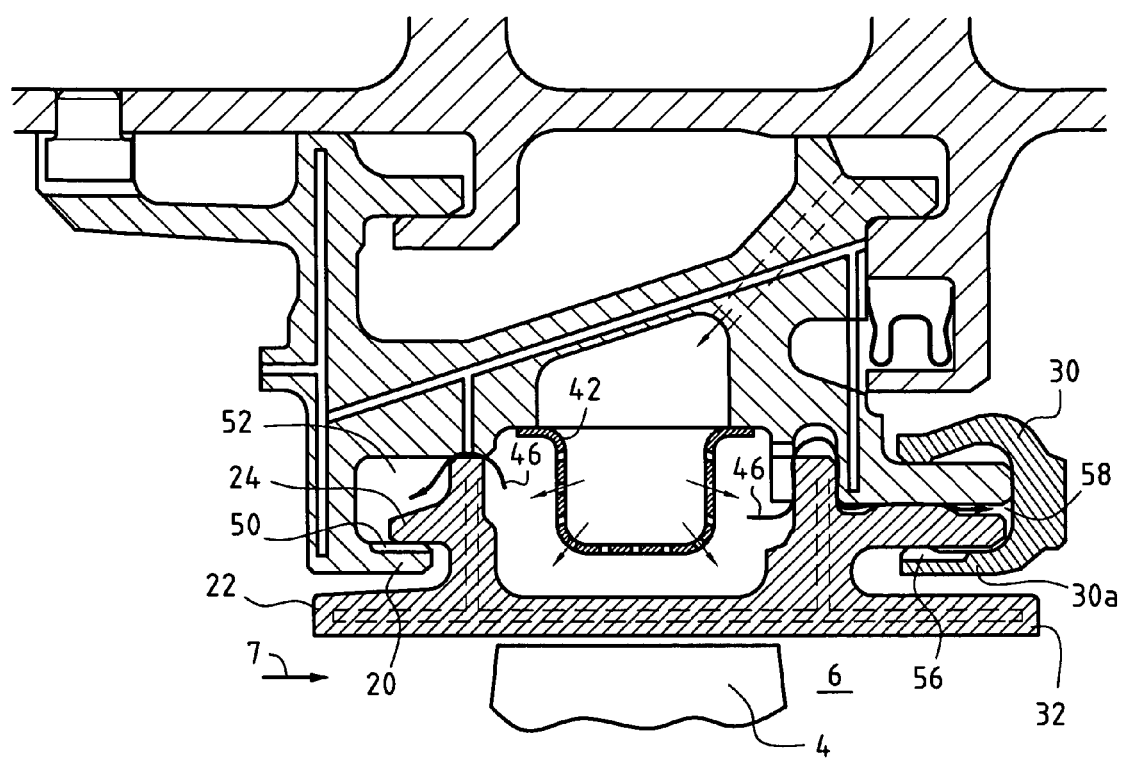
FIG. 3 is a longitudinal section view of a cooling device constituting another embodiment of the invention.

As shown in FIGS. 1 and 2, the air flow path(s) 48 of such an upstream circuit can be formed in the outer upstream hooks 24 of the ring segments 10. Alternatively, the air flow path(s) 50 of the upstream circuit can be formed in the inner upstream hooks 20 of the spacer segments 12 (FIG. 3).

In still another alternative that is not shown in the figures, air flow paths of the upstream circuit are formed both in the outer upstream hooks 24 of the ring segments 10, and in the inner upstream hooks 20 of the spacer segments 12.

The air coming from the impact cavity 36, and which tends to leak through the upstream fastener systems, is thus channeled into the upstream circumferential space 52, and is then directed towards the upstream notches 18 of the ring segments 10, following the air flow path(s) 48, 50, before being evacuated into the hot-gas flow path 6. As a result, this air enables the upstream tips 22 of the ring segments 10 to be cooled by convection, said upstream tips constituting a zone that is particularly exposed to hot gas and that is difficult to cool.

More precisely, with a flow representing about 0.2% of the total cooling-air flow of the ring segments 10, the air coming from leaks through the upstream fasteners enables the temperature of the face of the upstream tip 22 in contact with the hot gas to be lowered by up to 10° C., and enables the temperature of the top face of the tip to be lowered by up to 20° C.

The upstream circuit preferably comprises a plurality of axial air flow paths 48, 50 that are evenly spaced apart around its circumference. They can vary in number and in shape.

In order to channel the air leaks through the downstream fastener systems, a downstream circuit is provided comprising at least one axial air flow path 54, 56 opening out both into a downstream circumferential space 58 that is radially defined between the respective outer downstream hooks 34, 28 of the ring and spacer segments 10, 12, and into the downstream notches 26 of the ring segments.

The air flow path(s) 54 of the downstream circuit can be formed in the outer downstream hooks 34 of the ring segments 10 (FIG. 1). Alternatively, the air flow path(s) 56 can be formed in the inner branches 30a of the clips 30 (FIG. 3).

In still another alternative that is not shown in the figures, air flow paths of the downstream circuit are formed both in the outer downstream hooks 34 of the ring segments 10, and in the inner branches 30a of the clips 30.

The downstream circuit preferably comprises a plurality of axial air flow paths 54, 56 that are evenly spaced apart around its circumference. They can vary in number and in shape.

Thus, the air coming from the impact cavity 36, and which tends to leak through the downstream fastener systems, is channeled into the downstream circumferential space 58, and is then directed towards the downstream notches 26 of the ring segments 10, following the air flow path(s) 54, 56, before being evacuated into the hot-gas flow path 6. As a result, this air enables the downstream tips 32 of the ring segments 10 to be cooled by convection, said downstream tips constituting a zone that is particularly difficult to cool.

What is claimed is:

1. A cooling device for a stationary ring surrounding a gas-turbine hot-gas flow path, said ring being made up of a plurality of ring segments that are fastened by upstream and downstream fastener systems onto a plurality of spacer segments forming a stationary annular support spacer surrounding said ring so as to co-operate therewith to define at least one annular impact cavity into which at least one cooling-air supply orifice opens out, each ring segment having walls that are pierced with a plurality of air exhaust holes opening out both into the impact cavity, and into the hot-gas flow path, the device further comprising a cooling circuit configured to channel the air coming from leakage through the seals of the fastener systems that fasten together the ring and spacer segments, and to direct, without reducing said leakage, said air towards at least one of the axial ends of the ring segments in contact with the hot gas so as to cool said at least one of the axial ends, wherein said cooling circuit defines axial air flow paths for each upstream fastener system and/or downstream fastener system, said axial air flow paths being defined by recesses formed:

(a) for each upstream fastener system, in a radially inner surface of an outer upstream hook of each ring segment and/or in a radially outer surface of an inner upstream hook of each spacer segment, and (b) for each downstream fastener system, in a radially inner surface of an outer downstream hook of each ring segment and/or in a radially outer surface of an inner branch of a clip surrounding the outer downstream hook.

2. A device according to claim 1, wherein each upstream fastener system comprises:

an upstream notch of a ring segment that is radially defined between an upstream tip in contact with the hot gas, and said outer upstream hook; and said inner upstream hook of a spacer segment onto which the ring segment is fastened, said inner upstream hook being axially engaged in said upstream notch of the ring segment, wherein, at each upstream fastener system, the device includes an upstream circuit for channeling the air coming from leakage through the seals, and for directing said air towards the upstream tips of the ring segments so as to cool the upstream tips.

3. A device according to claim 2, wherein the upstream circuit comprises at least one axial air flow path opening out both into an upstream circumferential space that is radially defined between the inner upstream hooks and the axial walls of the spacer segments, and into the upstream notches of the ring segments that are fastened onto said spacer segments.

4. A device according to claim 3, wherein the upstream circuit comprises a plurality of axial air flow paths that are evenly spaced apart around its circumference.

5. A device according to claim 3, wherein the air flow paths are formed in the outer upstream hooks of the ring segments.

6. A device according to claim 3, wherein the air flow paths are formed in the inner upstream hooks of the spacer segments.

7. A device according to claim 1, wherein each downstream fastener system comprises:

a downstream notch of a ring segment that is radially defined between a downstream tip in contact with the hot gas, and said outer downstream hook;

said outer downstream hook of a spacer segment onto which the ring segment is fastened, said outer downstream hook of the spacer segment bearing radially against said outer downstream hook of the ring segment; and said clip surrounding the outer downstream hooks of the spacer and ring segments;

wherein, at each downstream fastener system, the device includes a downstream circuit for channeling the air coming from leakage through the seals, and for directing said air towards the downstream tips of the ring segments so as to cool the downstream tips.

8. A device according to claim 7, wherein the downstream circuit comprises at least one axial air flow path opening out both into a downstream circumferential space that is radially defined between the outer downstream hooks of the ring and spacer segments, and into the downstream notches of the ring segments.

9. A device according to claim 8, wherein the downstream circuit comprises a plurality of axial air flow paths that are evenly spaced apart around its circumference.

10. A device according to claim 8, wherein the air flow paths are formed in the outer downstream hooks of the ring segments.

11. A device according to claim 8, wherein the air flow paths are formed in the inner branches of the clips.

12. A stationary ring surrounding a gas-turbine hot-gas flow path, the stationary ring including a cooling device according to claim 1.

13. A device according to claim 1, wherein said cooling circuit defines said axial air flow paths for each upstream fastener system.

14. A device according to claim 13, wherein said axial air flow paths are defined by recesses formed in said radially inner surface of said outer upstream hook of each ring segment.

15. A device according to claim 13, wherein said axial air flow paths are defined by recesses formed in said radially outer surface of said inner upstream hook of each spacer segment.

16. A device according to claim 13, wherein said cooling circuit defines said axial air flow paths for each downstream fastener system.

17. A device according to claim 1, wherein said cooling circuit defines said axial air flow paths for each downstream fastener system.

18. A device according to claim 17, wherein said axial air flow paths are defined by recesses formed in said radially inner surface of said outer downstream hook of each ring segment.

19. A device according to claim 17, wherein said axial air flow paths are defined by recesses formed in said radially outer surface of said inner branch of said clip surrounding the outer downstream hook.

* * * * *